United States Patent [19]

Dominke

[11] Patent Number: 4,985,839
[45] Date of Patent: Jan. 15, 1991

[54] ANTILOCK BRAKING SYSTEM
[75] Inventor: Peter Dominke, Bietigheim-Metterz, Fed. Rep. of Germany
[73] Assignee: Robert Bosch GmbH, Stuttgart, Fed. Rep. of Germany
[21] Appl. No.: 346,835
[22] PCT Filed: Aug. 26, 1987
[86] PCT No.: PCT/EP87/00485
   § 371 Date: Mar. 30, 1989
   § 102(e) Date: Mar. 30, 1989
[87] PCT Pub. No.: WO88/02709
   PCT Pub. Date: Apr. 21, 1988
[30] Foreign Application Priority Data
   Oct. 8, 1986 [DE] Fed. Rep. of Germany ....... 3634241
[51] Int. Cl.$^5$ .............................................. B60T 8/32
[52] U.S. Cl. ................. 364/426.02; 303/103
[58] Field of Search .............. 364/426.01, 426.02, 364/426.03; 180/197; 303/95-97, 103

[56] References Cited
U.S. PATENT DOCUMENTS

| | | | |
|---|---|---|---|
| 4,320,460 | 3/1982 | Brearley et al. | 364/426.02 |
| 4,485,445 | 11/1984 | Braschel | 364/426.02 |
| 4,788,644 | 11/1988 | Inagaki | 180/197 |
| 4,859,002 | 8/1989 | Yoshino | 303/95 |

Primary Examiner—Gary Chin
Attorney, Agent, or Firm—Felfe & Lynch

[57] ABSTRACT

An antilock braking system is described in which, after a pressure reduction, the pressure is again built up for a time duration having first a large gradient and then a smaller gradient. The invention relates to the optimal determination of that duration. It is proposed to make that duration a function of the duration of the directly preceding pressure reduction and of the ratio of the duration of the pressure buildup to the duration of the pressure reduction in the preceding control cycle.

4 Claims, 2 Drawing Sheets

Fig. 3a
PRIOR ART
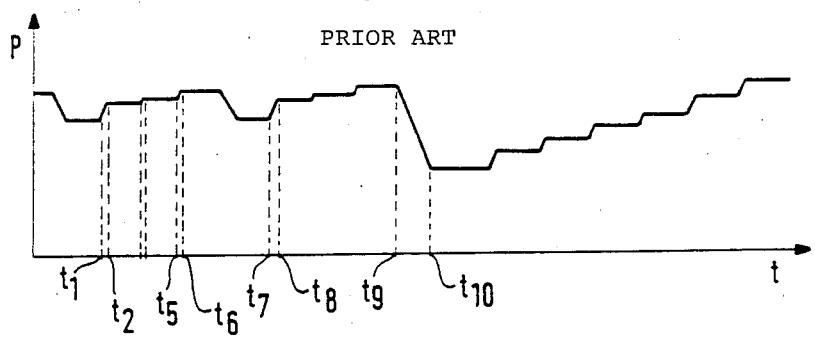
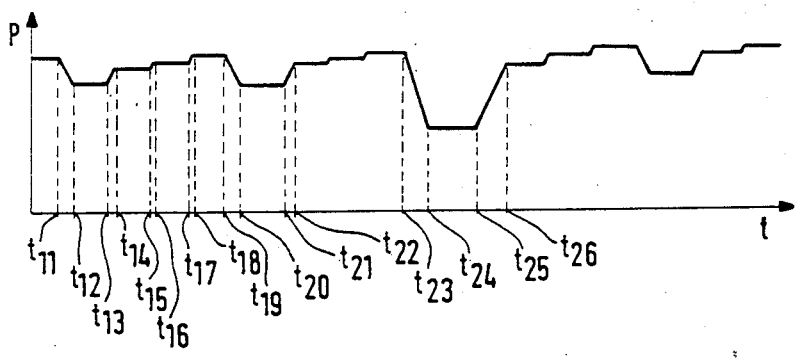
Fig. 3b

ANTILOCK BRAKING SYSTEM

BACKGROUND OF THE INVENTION

The present invention relates to an antilock braking system for a motor vehicle brake system having a wheel speed sensor and an electronic evaluation circuit which generates brake pressure control signals. The evaluation circuit includes a timing device that produces an increase of the brake pressure, for a time duration, with a large gradient, relative to the gradient over the entire time duration, and then with a smaller gradient. The time duration is a function of the length of the directly preceding pressure reduction.

An antilock braking system of this type is known from published German patent application OS No. 23 07 368, to which U.S. Pat. No. 3,888,550 corresponds. In this known system a deceleration signal which reduces the brake pressure is supplied to a timing element. When this deceleration signal is of greater length than the time constant of the timing element, a timing element with a long time constant is made effective in fixing the duration of the first pressure-buildup pulse, which then determines the length of the pressure buildup. If the pressure reduction was shorter than the first-mentioned time constant, a timing element with a shorter time constant becomes controlling in fixing the duration of the pressure-buildup pulse. Thus the duration of the pressure-buildup pulse is made a function of the duration of the preceding pressure reduction.

From published German patent application OS No. 24 60 904 to which U.S. Pat. No. 4,054,328 corresponds, it is further known to make the determination of the duration of the first pressure-buildup pulse, which produces a pressure buildup with a large gradient, a function of the duration of the pressure rise in the preceding control cycle rather than of the preceding pressure reduction. For example, when the pressure buildup with the small gradient is produced through several pulses, the sum of the pulses required is determined and allowance is made for that sum in fixing the duration of the first pressure buildup in the next control cycle.

SUMMARY OF THE INVENTION

The determination of the duration of the first pressure-buildup pulse, i.e., the duration of the pressure buildup with a large gradient according to the invention, makes better allowance for the different characteristic curves for pressure buildup and pressure reduction and thus arrives at a more nearly optimal duration for the pressure buildup which brings the brake pressure instantly into the vicinity of the lockup pressure.

For a full understanding of the present invention, reference should now be made to the following detailed description of the preferred embodiments of the invention and to the accompanying drawings.

BRIEF DESCRIPTION OF THE DRAWINGS

FIG. 3a is a typical brake pressure curve obtainable with an antilock braking system known in the art.

FIG. 3b is a typical brake pressure curve which is obtainable with the antilock braking system according to the present invention.

DESCRIPTION OF THE PREFERRED EMBODIMENT

Figure 1:
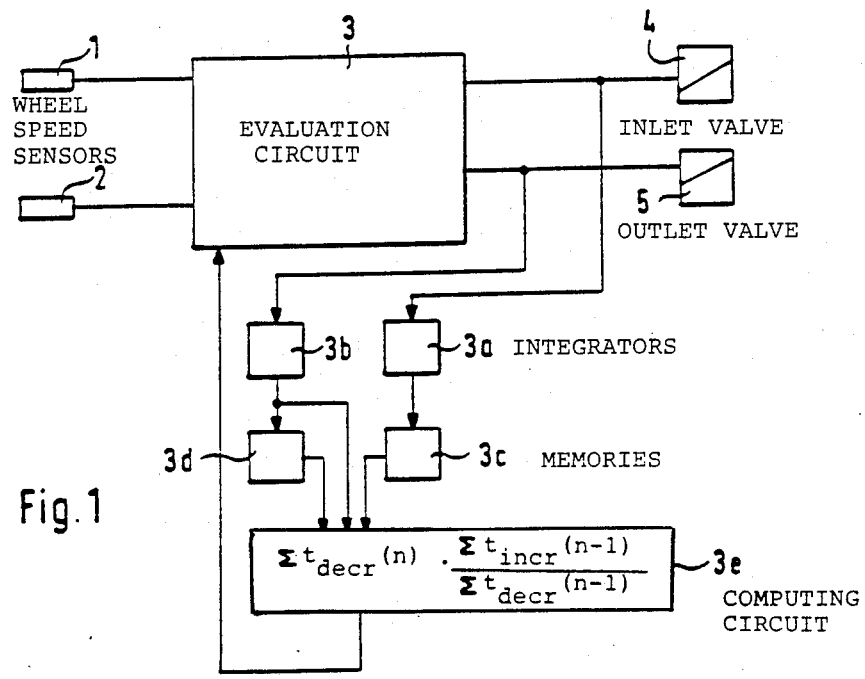
FIG. 1 is a block diagram of the electronic control portion of an antilock braking system according to the preferred embodiment of the present invention.

In FIG. 1, sensors 1 and 2 are associated with two wheels of the vehicle and deliver signals corresponding to the wheel speed to an evaluation circuit 3. The latter generates therefrom brake-pressure signals for actuation of a pressure inlet valve 4 and an outlet valve 5 to control the hydraulic brake pressure for one wheel. For the sake of simplicity, the corresponding valves for the other wheel are not shown in FIG. 1.

The evaluation circuit 3 includes two integrators $3a$ and $3b$, two memories $3c$ and $3d$, and a computing circuit $3e$. Corresponding components (not shown) are provided for the second valve combination, which is also not shown. The integrator $3a$ connected to the actuating line for the pressure inlet valve 4 determines, during the pressure-buildup phase, the sum of the pressure-buildup times in a control cycle and stores a corresponding value in the memory $3c$. Similarly, the integrator $3b$ (connected to the outlet valve actuating line) determines the sum of the pressure-reduction times in a control cycle and stores that value in the memory $3d$. The result $\Sigma t_{decr}(n)$ determined by the integrator $3b$ is also fed directly to the computing circuit $3e$. From it and the retrieved results $\Sigma t_{incr}(n-1)$ and $\Sigma t_{decr}(n-1)$ of the previous cycle, stored in the memories $3c$ and $3d$, the computing, circuit $3e$ generates a signal S corresponding to the following equation:

$$S = \Sigma t_{decr}(n) \cdot \frac{\Sigma t_{incr}(n-1)}{\Sigma t_{decr}(n-1)}$$

That signal S is fed to the evaluation section 3 for determination of the duration of the pressure buildup with a large gradient. This determination may be made in accordance with FIG. 2, for example.

An acceleration signal $+b$ is fed to a terminal 20 and by way of an OR gate 21 reaches a terminal 22 to which the inlet valve 4 is connected. The $+b$ signal causes the brake pressure to be held constant until the wheel acceleration falls below a preset value. The output signal S of the computing circuit $3e$ is present at the terminal 25. The signal S fixes the time constant of a monostable circuit 24. The trailing edge of the $+b$ signal sets the monostable circuit 24. The latter then delivers a signal during the length of the time constant fixed by the signal S, which, however, has no effect (i.e., the inlet valve is not actuated) and thus permits a buildup of pressure. At the end of the time constant of the monostable circuit 24, the trailing edge of its output signal enables a pulse generator 23 which then feeds pulses at a preset pulse/no-pulse ratio to the inlet valve and thus produces a pressure buildup with a smaller gradient.

Figure 2:
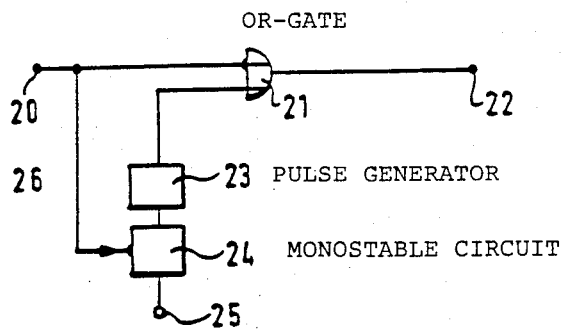
FIG. 2 is a block diagram of an evaluation circuit which may be used in the control system of FIG. 1.

The embodiment of FIGS. 1 and 2 can also be implemented with a microcomputer controller.

Shown in FIG. 3a is a pressure curve obtainable in accordance with the prior art U.S. Pat. No. 4,054,328. It is based on the assumption that the pressure buildup from $t_7$ to $t_8$, for example, corresponds, in accordance with the prior art, to the sum of the pressure-buildup times in the preceding cycle, that is, $(t_2-t_1)+(t_4-t_3)+(t_6-t_5)$. Now if a sudden $\mu$-jump (change in coefficient of friction) in the region from $t_9$ to $t_{10}$ leads to a long pressure reduction, as shown in that region, it will be followed by a protracted (and slow) pressure buildup until lockup pressure is again reached.

FIG. 3b illustrates the same case for the electronic control system according to the invention. For determination of the duration ($t_{22}-t_{21}$), for example, the pressure-reduction time $t_{decr}(n)=(t_{20}-t_{19})$ is measured, and the pressure-reduction time $t_{decr}(n-1)$ ($t_{12}-t_{11}$) and the sum of the pressure-buildup times $t_{inc}(n-1)$ ($t_{14}-t_{13}$)+($t_{16}-t_{15}$)+($t_{18}-t_{17}$) were also measured and have been stored. By considering the directly preceding pressure-reduction time ($t_{24}-t_{23}$), for example, and assuming a sudden $\mu$-jump in the region from $t_{23}$ to $t_{24}$, a large pressure buildup in the region from $t_{25}$ to $t_{26}$ occurs and lockup pressure is rapidly reached. This is in contrast to the slow buildup after $t_{10}$ in FIG. 3a.

The first buildup pulse ($t_{13}$ to $t_{14}$) is obtained by allowing for a percentage of the preceding pressure-reduction time (e.g., 70%).

The formula $$s = \Sigma t_{decr}(n) \cdot \frac{\Sigma t_{incr}(n-1)}{\Sigma t_{decr}(n-1)}$$

gives the duration of the pressure buildup resulting in renewed instability (lockup-pressure level).

Since instability should not be reached with the first buildup pulse but only with the third to fifth pulses, the first pulse (large gradient) is triggered with $t=x \cdot s$. The subsequent pulses are triggered with $t=y \cdot s$.

In this preferred embodiment, x is about 70%, and y about 8%.

S thus is reached after the fourth buildup pulse.

There has thus been shown and described a novel antilock braking system which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

I claim:

1. An antilock braking system for a vehicle comprising:
   (a) at least one sensor for monitoring the speed of a vehicle wheel and producing wheel speed signals;
   (b) an electronic evaluation circuit which evaluates the wheel speed signals and generates control signals for a brake pressure control system which reduces and increases brake pressure in control cycles, said brake pressure being increased for a time duration at first with a large gradient relative to the gradient over the entire time duration and then with a relatively smaller gradient until a desired increase in pressure is reached; and
   (c) a timing device which determines said time duration of brake pressure increase, said time duration being a function of the pressure reduction time in the current control cycle and of the ratio of the pressure buildup time to the pressure reduction time in the immediately preceding control cycle.

2. The anitlock braking system defined in claim 1, wherein, during a first control cycle, said time duration is a predetermined percentage of the preceding pressure-reduction time.

3. The antilock braking system defined in claim 1, wherein said evaluation circuit triggers the pressure buildup and the pressure reduction by pulses, and wherein said time duration is a function of the sum of the directly preceding pressure-reduction times and of the ratio of the sums of the pressure-buildup times and pressure-reduction times of the immediately preceding control cycle.

4. An anti-lock braking system as in claim 3 wherein the first pulse produces 70% of the increase in brake pressure, the ensuing pulses each producing 8% of the increase in brake pressure, whereby the desired increase in pressure is reached after the fourth pulse.

* * * * *